United States Patent
Bays et al.

(10) Patent No.: US 11,168,275 B2
(45) Date of Patent: Nov. 9, 2021

(54) ON-BOARD SEPARATION OF OXYGENATES FROM FUELS

(71) Applicant: BATTELLE MEMORIAL INSTITUTE, Richland, WA (US)

(72) Inventors: John T. Bays, West Richland, WA (US); Katarzyna Grubel, Richland, WA (US); David J. Heldebrant, Richland, WA (US); John C. Linehan, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 7 days.

(21) Appl. No.: 16/655,743

(22) Filed: Oct. 17, 2019

(65) Prior Publication Data
US 2020/0123462 A1 Apr. 23, 2020

Related U.S. Application Data

(60) Provisional application No. 62/746,899, filed on Oct. 17, 2018.

(51) Int. Cl.
*C10L 10/10* (2006.01)
*C10G 17/02* (2006.01)
(Continued)

(52) U.S. Cl.
CPC .......... *C10L 10/10* (2013.01); *B01D 11/0492* (2013.01); *B01D 15/203* (2013.01); *C10G 17/02* (2013.01); *C10G 17/10* (2013.01); *C10G 25/12* (2013.01); *C10G 29/00* (2013.01); *C10L 1/06* (2013.01); *C10L 1/08* (2013.01); *F02M 37/0088* (2013.01); *F02M 37/22* (2013.01); *C10G 2300/104* (2013.01); *C10G 2300/1044* (2013.01); *C10G 2300/1055* (2013.01); *C10G 2300/201* (2013.01); *C10G 2300/202* (2013.01); *C10G 2400/02* (2013.01); *C10G 2400/04* (2013.01); *C10L 2200/0254* (2013.01); *C10L 2200/0415* (2013.01); *C10L 2200/0423* (2013.01); *C10L 2200/0446* (2013.01);
(Continued)

(58) Field of Classification Search
None
See application file for complete search history.

(56) References Cited

U.S. PATENT DOCUMENTS

2005/0263441 A1* 12/2005 Antonio ............... C10G 25/003
208/244
2007/0184557 A1* 8/2007 Crudden ................ C08G 77/50
436/171
(Continued)

*Primary Examiner* — Tam M Nguyen
(74) *Attorney, Agent, or Firm* — Derek H. Maughan

(57) ABSTRACT

Methods for separation of oxygenates or other chemical components from fuels using chemical processes and separations including, but not limited to, onboard applications in vehicles. These separations may take place using a variety of materials and substances whereby a target material of interest is captured, held, and then released at a desired location and under desired conditions. In one set of experiments we demonstrated an enhancement in the separation of diaromatics by >38 times over gasoline and aromatics by >3.5 times over gasoline. This would give an advantage to reducing cold-start emissions, or emissions during transient conditions, in either gasoline or diesel.

7 Claims, 3 Drawing Sheets

(51) Int. Cl.
*C10G 17/10* (2006.01)
*C10G 25/12* (2006.01)
*C10L 1/08* (2006.01)
*C10G 29/00* (2006.01)
*F02M 37/22* (2019.01)
*F02M 37/00* (2006.01)
*B01D 11/04* (2006.01)
*B01D 15/20* (2006.01)
*C10L 1/06* (2006.01)
*F02M 25/14* (2006.01)

(52) U.S. Cl.
CPC ... *C10L 2270/023* (2013.01); *C10L 2270/026* (2013.01); *C10L 2290/541* (2013.01); *C10L 2290/542* (2013.01); *C10L 2290/544* (2013.01); *F02M 25/14* (2013.01)

(56) References Cited

U.S. PATENT DOCUMENTS

| | | | |
|---|---|---|---|
| 2009/0288962 A1* | 11/2009 | Yantasee | G01N 27/42 205/790 |
| 2010/0300975 A1* | 12/2010 | Pate | B01J 20/3202 210/668 |
| 2012/0106691 A1* | 5/2012 | Toth | G21G 1/001 376/156 |
| 2017/0058204 A1* | 3/2017 | Khaled | C10G 25/09 |
| 2017/0073589 A1* | 3/2017 | Rastelli | B01J 20/18 |
| 2017/0354951 A1* | 12/2017 | O'Rear | B01J 20/3236 |
| 2018/0119029 A1* | 5/2018 | Banerjee | B01D 3/14 |
| 2019/0262798 A1* | 8/2019 | Zhan | B01J 20/3204 |
| 2019/0300801 A1* | 10/2019 | Sundaram | C10G 35/085 |
| 2019/0368451 A1* | 12/2019 | Hamad | F02D 19/0671 |
| 2020/0391180 A1* | 12/2020 | Eddaoudi | F02B 47/04 |

\* cited by examiner

[EMIM]OAc

[BMIM]MeSO4

TMG

TBD

K1

EDA

ON-BOARD SEPARATION OF OXYGENATES FROM FUELS

PRIORITY

This application claims priority from provisional patent application No. 62/746,899 filed Oct. 17, 2018 the contents of which are incorporated herein by reference.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

BACKGROUND OF THE DISCLOSURE

For the foreseeable future, internal combustion engines (ICE) will account for the majority of vehicles used for transportation and shipping worldwide, suggesting the need for continued advances to mitigate adverse health and environmental effects, and to improve energy security. Improved fuel efficiency from internal combustion engines could result in lower dependence upon foreign oil resources, lower greenhouse gas emissions, and reduced vehicle emissions, (including particulate emissions) as well as other air pollutants. To achieve these goals, automakers are focusing on vehicle light-weighting, which includes engine light-weighting and down-sizing.

A common strategy for designing smaller engines that have the same power and performance as larger engines includes increasing intake air pressure to improve combustion, a process called boosting, by using turbo- or superchargers to force air into the combustion chamber thus increasing the air-to-fuel ratio for leaner combustion. A challenge with boosted engines is that the compressed air becomes heated and pressurized, both of which increase the tendency of an engine to "knock"; or prematurely initiate combustion of the air/fuel mixture, which can lead to engine damage.

To prevent or reduce knock a variety of strategies have been attempted. In one instance, an engine control system can serve to advance the spark timing away from the most efficient point in the system. This however, reduces some or all of the efficiency gains achieved by boosting. Increasing the knock resistance of the fuel by using higher octane gasoline offers another means of preventing or reducing knock. The introduction of oxygenates such as ethanol, and ethers such as methyl, ethyl or tert-butyl ethers has also served to reduce knocking. The growth in ethanol use can be expected to increase as automobile manufacturers have permitted the use of fuels containing up to 15% ethanol by volume in a majority of new vehicles sold in the US. Today, 98% of all gasoline is blended with ethanol, contributing to more than 10% of the US gasoline supply.

Isomers of butanol are also promising fuel blend stocks, having known renewable production pathways, while providing favorable increases in octane and energy density. They also blend well with lower vapor pressures, when compared to ethanol. Recent US Environmental Protection Agency (EPA) waivers permit up to 16% by volume of iso-butanol to be added in place of ethanol, extending a 12.5% waiver already in place. Both 1- and 2-butanol share some advantages with iso-butanol, and have renewable routes for production, under the category of biobutanols, with three of the four butanol isomers, the exception being tert-butanol, having an ASTM blending standard, and some advocacy as potential gasoline bioblend-stocks. These properties and availability of renewable production pathways make some of the butanol isomers attractive candidates for improving gasoline octane values.

Recent studies suggest that supplying gasoline with a high octane rating across the whole drive cycle unnecessarily consumes high-octane fuel components, such as ethanol, even when higher knock resistance is unnecessary. Since ethanol and other gasoline components that increase gasoline octane rating are more expensive to produce, the value for the fuel is not fully realized by the consumer. To better utilize the anti-knock potential inherent in individual fuel constituents, a two-fuel or dual-fuel system, where one component is a high-octane oxygenate, and the other component a lower-octane fuel, such as a gasoline blend stock for oxygenated blending (BOB), would provide combinations of these two fuels in the optimum ratio to prevent the engine from knocking through real-time delivery. The oxygenate-rich fuel would be supplied during periods of high engine load (acceleration). During periods of low engine load (idle or constant speed), the need for a higher octane is lessened, and combustion of oxygenates provides no additional benefit.

This approach, generally referred to as octane-on-demand (OOD) or dual-fuel, has been the focus of much recent research, both from the perspective of the fuel oxygenate pairing with the lower-octane fuel component, as well as the vehicle components needed to enable this strategy.

Engine and vehicle simulations suggest that OOD can provide attractive increases in fuel economy over existing, naturally-aspirated engines of about 26%, depending upon the drive cycle investigated. These improvements presuppose a 50% engine downsizing, requiring higher compression ratios with a concomitant increase in ethanol demand to reduce knock. Similar results were reported for fuel combinations that rely on oxygenates other than ethanol, such as methanol, methyl tert-butyl ether (MTBE), or ethyl tert-butyl ether (ETBE), with the low-octane fuel being a refinery naphtha.

Simulations show that use methanol and naphtha for the high and low octane fuels, respectively, yielded reductions in brake specific $CO_2$ emissions by more than 5% overall, and more than 25% at high engine load, compared to a baseline market gasoline. The downsized engine realized a 9% reduction in volumetric fuel consumption, however, even without downsizing a 7% reduction in volumetric fuel consumption was realized, compared to market gasoline. These fuel economy savings were attributed to the higher heating value of the lower octane fuel and relatively low methanol consumption. In addition to simulations, quantification of these fuel economy gains, and greenhouse gas reductions includes considerable engine testing.

While these advantages are known, dedicated vehicle storage and delivery systems for a gasoline and an oxygenate have not been attempted. This is due largely to the lack of an existing infrastructure at the point of purchase for delivering fuels having more than one fuel component. Since the individual fuel components are not by themselves backwardly compatible with existing vehicles, the effect is the same as simultaneously introducing two new fuels to the market, along with the need to provide some degree of consumer education as to how to use them. These challenges could be overcome by a system onboard the vehicle that separates the high and low octane components of an existing market fuel, such as E10 gasoline, relieving the need for introduction of a new fuel, while providing the advantages of octane-on-demand. The present disclosure provides significant advances toward addressing these challenges.

Additional advantages and novel features of the present disclosure will be set forth as follows and will be readily apparent from the descriptions and demonstrations set forth herein. Accordingly, the following descriptions of the present disclosure should be seen as illustrative of the disclosure and not as limiting in any way.

SUMMARY

Examples of strategies for separation of preselected materials from fuels using chemical processes and separations to capture, remove and release such materials are provided. These applications include but are not limited to, onboard applications in vehicles. These separations may take place using a variety of materials and substances whereby a target material of interest is captured, held, and then released at a desired location and under desired conditions. In a preferred embodiment, the captured material is directed to second location distinct from the first and in some cases the captured material may be released and then reintroduced into the fuel or the engine at a later point in time.

Examples are provided for the use of both solid and liquid capture materials that are selectively releasable and allow for applications in a variety of fuel types, gasoline, diesel, naphtha, LNG and others. In addition, removal of a variety of types of materials including, alcohols, oxygenates, olefins, aromatics, paraffins, and other materials is also contemplated. While the specifics of a particular material may vary, generally speaking the method involves introducing fuel to a selectively releasable capture material, capturing the preselected material with the selectively releasable capture material to form a captured material; removing the captured material from the fuel; and releasing the preselected material from the captured material.

In some instances, the selectively releasable material is a solid, typically porous material. As described below, specifically designed SAMMS (self-assembled monolayers on mesoporous support) materials have been demonstrated to show effectivity in this regard. In other instances, a liquid capture system has been designed using materials that are targeted to attach to the preselected materials and form an immiscible layer in the fuel. This immiscible layer can then be separated and removed and subjected to conditions that will engender a release of the preselected materials and in many cases regenerate the capture material. Depending upon the specific materials involved release of the captured material may be performed by swinging the polarity of the captured material, altering the temperature or pressure of the environment or otherwise altering a preselected condition in such a way so as to causes the captured material to be released from the selectively releasable capture material. While in many instances the underlying material once released is regenerated or regeneratable, this is not necessarily a requirement. In some applications, particularly onboard applications the released material may be collected and reinserted into the fuel stream where these components can provide desired advantages to performance.

In one instance a liquid embodiment is described wherein a commercial fuel is introduced to a liquid that binds the preselected materials from the commercial fuel in an immiscible layer within the commercial fuel. This immiscible layer is then separated from the commercial fuel; and the immiscible layer subjected to preselected conditions to release the preselected materials and regenerate the liquid. The liquid could be any of a variety adaptable for the purpose including but not limited to single-component alkanol guanidines, K-1 carbonate species or other materials that form an immiscible layer when brought into contact with the preselected material of interest. In some instances, the immiscible layer includes a zwitterion formed from the reaction of an acid gas and a single-component alkanol quinidine. In other instances, the immiscible layer is formed from the reaction of an acid gas and the preselected material.

In other applications a method for on-board separations of preselected materials from a commercial fuel is described where a fuel is introduced to a solid sorbent material that captures the preselected materials, the preselected solid sorbent materials including the captured materials are then separated from the commercial fuel; and subjected to preselected conditions to release the preselected materials. In some cases, the solid sorbent may also be regenerated. In many instances the solid sorbent material is a porous sorbent material having a surface designed to attract the preselected material. Examples of such surfaces include meso and micro porous materials such as microporous silicas and SAMMS-based sorbent materials.

In one such arrangement, we demonstrated that we could enhance the separation of aromatic species over aliphatic species. In one set of experiments we demonstrated an enhancement in the separation of diaromatics by >38 times over gasoline and aromatics by >3.5 times over gasoline. This would give an advantage to reducing cold-start emissions, or emissions during transient conditions, in either gasoline or diesel. This basic methodology may be implemented through a variety of mechanisms (both liquid and solid) however three exemplary types are described herein.

First are liquid switchable polarity solvent systems, which use materials used for acid gas capture (referred to as binding organic liquids (BOLs) and $CO_2$ binding organic liquids ($CO_2$BOLs)) to capture alcohols and oxygenates in a fuel such as gasoline. Being initially miscible with the fuel, upon being triggered, they form an immiscible layer in the fuel that retains the alcohols, oxygenates, or targeted chemical component, enabling the separation of the immiscible layer from the fuel, and then later switching of the switchable polarity solvent to release the alcohols and oxygenates. In some instances, an acid gas like $CO_2$ is used to chemically form a bond between the switchable polarity solvent and the targeted chemical component, or is used to switch the polarity of the solvent to enable capture of the targeted chemical component, or release of the chemical component.

In other applications, ionic liquids are used to force the alcohol to partition into the polar ionic liquid layer, with the effectiveness of the separation depending on the selected ionic liquid. This approach is good for alcohols or other oxygenates and can be tuned to improve separation based upon the identity of the chemical being separated. Among the materials disclosed for such capture are ionic liquids, including salts in the liquid state, and may encompass one-time charge-balanced combinations of anions and cations and in some cases zwitterions. Most ionic liquids will have some ability to extract an oxygenate from a hydrocarbon-based fuel, however the efficiency of that separation will vary based upon the ionic liquid, the oxygenate, and the fuel.

Some liquids will be more effective than others. Examples of such preferred ionic liquids include combinations of monatomic cations and monatomic anions, polyatomic cations and monatomic anions, monatomic cations and polyatomic anions, and polyatomic cations and polyatomic anions. Monatomic cations and monatomic anions include but are not limited to elements in an ionized state, such as $N^+$ or $Cl^-$. Polyatomic cations include but are not limited to, cations of the general chemical classes: imidazolium, pyridinium, ammonium, piperidinium, pyrrolidinium, phosphonium, and other polyatomic organic or inorganic cations. Polyatomic anions can include, but are not limited to, anions such as hexafluorophosphate, tetrafluoroborate, tosylate, methylsulfate, benzenesulfonates, phosphates, sulfates, dicyanamides, thiocyanates, anions of esters, and other polyatomic organic or inorganic anions. Cations and anions, whether monatomic or polyatomic, may be have valences of one, or greater than one. These materials may be immiscible with the hydrocarbon-based fuel under certain conditions, including temperature, pressure or other factors.

In a third embodiment a solid sorbent such as a porous material like a SAMMS-based sorbent (described hereafter), with or without $CO_2$ can be used to cause the alcohol, oxygenate, or targeted chemical components, to separate, with the solid sorbent already distinct from the hydrocarbon based fuel. Without $CO_2$, the polar nature of the demonstrated EDA-SAMMS surface causes partitioning of the alcohol or oxygenate—this is flexible and different surfaces may be better tuned for different oxygenates. SAMMS-based sorbents having a non-polar, or less-polar nature may be used to partition other targeted chemical components into the sorbent material. In those instances where the capture material utilizes $CO_2$, which can then be released and recycled, the $CO_2$ can be used as described for the switchable solvents to trigger capture or release of the captured material. The ones without $CO_2$ release the ethanol or oxygenate upon heating, or may be using another separation approach (vacuum-swing, or heating and vacuum-swing).

In one use case, a method for separating ethanol and other oxygenates from a commercial gasoline that contains ethanol, oxygenates or other targeted chemical compounds and combinations thereof includes the steps of: introducing gasoline from a first fuel tank to a separator containing a switchable ionic liquid, to form a polar ionic liquid layer that absorbs ethanol and/or oxygenates from the commercial gasoline as a bound ionic liquid that is immiscible with the gasoline, separating the immiscible gasoline and ionic liquid layers, switching the binding organic liquid to release the targeted chemical compound.

In some instances, a modification of this basic process takes place in an instance wherein the ionic liquid is formed by the reaction of an alcohol, carbon dioxide, and a guanidine. In another example, the ionic liquid is formed by reaction of carbon dioxide with a single-component alkanol guanidine. In these instances, adding $CO_2$ to the separator forms a polar ionic carbonate or carbamate liquid layer, either binding the alcohol chemically as part of the carbonate or carbamate, or absorbing the alcohol or oxygenate in the polar ionic liquid layer, which is immiscible with gasoline.

While in both instances, the molecules were guanidines, TMG requires $CO_2$ and the alcohol, while K1 is the single-component alkanol guanidine, and only requires $CO_2$ to form the ionic liquid. The power of using K1 is that the ionic liquid can then separate any likely oxygenate that might be considered for a fuel component. In some implementations of the process the gasoline is returned to the first fuel tank after a separation process. The ethanol and/or oxygenates may then be directed and held in a second fuel tank. In some instances, switching the binding organic liquid may include heating, altering the polarity, or otherwise switching the solvent. In some other instances the $CO_2$ may be recycled.

In another embodiment, a method for operating a gasoline-powered engine is described wherein gasoline that contains ethanol and/or oxygenates is introduced from a first fuel tank to a separator containing a switchable ionic liquid. The combination of the gasoline, switchable ionic liquid, and the trigger for switching polarity causes a polar ionic liquid layer to form that is either combined with ethanol and/or oxygenates or absorbs ethanol and/or oxygenates from the commercial gasoline, as that is immiscible with the gasoline. The immiscible gasoline and ionic liquid layers are separated, and the binding organic liquid treated to recover the ethanol and/or oxygenates. These separated materials (alcohols such as ethanol and/or oxygenates) can then be held in a secondary fuel tank; and inserted from the secondary fuel tank into a fuel feed at a desired time and location.

The ionic liquid may be similar in action to a K1-carbonate species or a single-component alkanol guanidine. In some instances, the gasoline may be returned to the first fuel tank, and in some instances the step of switching the binding organic liquid may include heating or switching the chemical polarity or dielectric constant. In those instances where $CO_2$ is required to form the ionic liquid, the $CO_2$ may be recycled after release.

In any of these arrangements, the separated and subsequently released materials (typically ethanol and oxygenates) may be directed to and held in a second fuel tank. In some circumstances the releasing of the separated material may be performed by heating the material in the separator, or by altering the polarity of the material in the separator. In some instances, the $CO_2$ may be recycled.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

Various advantages and novel features of the present disclosure are described herein and will become further readily apparent to those skilled in this art from the following detailed description. In the preceding and following descriptions, I have shown and described only the preferred embodiment of the disclosure, by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

BRIEF DESCRIPTION OF THE DRAWINGS

FIG. 4A is TMG is 1,1,3,3-tetramethylguanidine.

FIG. 4B is TBD is 1,5,7-triazabicyclo[4.4.0]dec-5-ene.

FIG. 4C is K1 is 1-((1,3-dimethylimidazolidin-2-ylidene)amino)-3-methoxypropan-2-ol.

FIG. 4D is EDA is N-[3-(trimethoxysilyl)propyl]ethylenediamine. In this study, EDA was bound as a monolayer to make self-assembled monolayers on a mesoporous silica support (SAMMS), or EDA-SAMMS.

FIG. 6B one CO2 molecule reacts with amines from two EDA moieties, and in FIG. 6C CO2 reacts with two amines from one EDA moiety.

DETAILED DESCRIPTION OF THE DISCLOSURE

Figure 1:
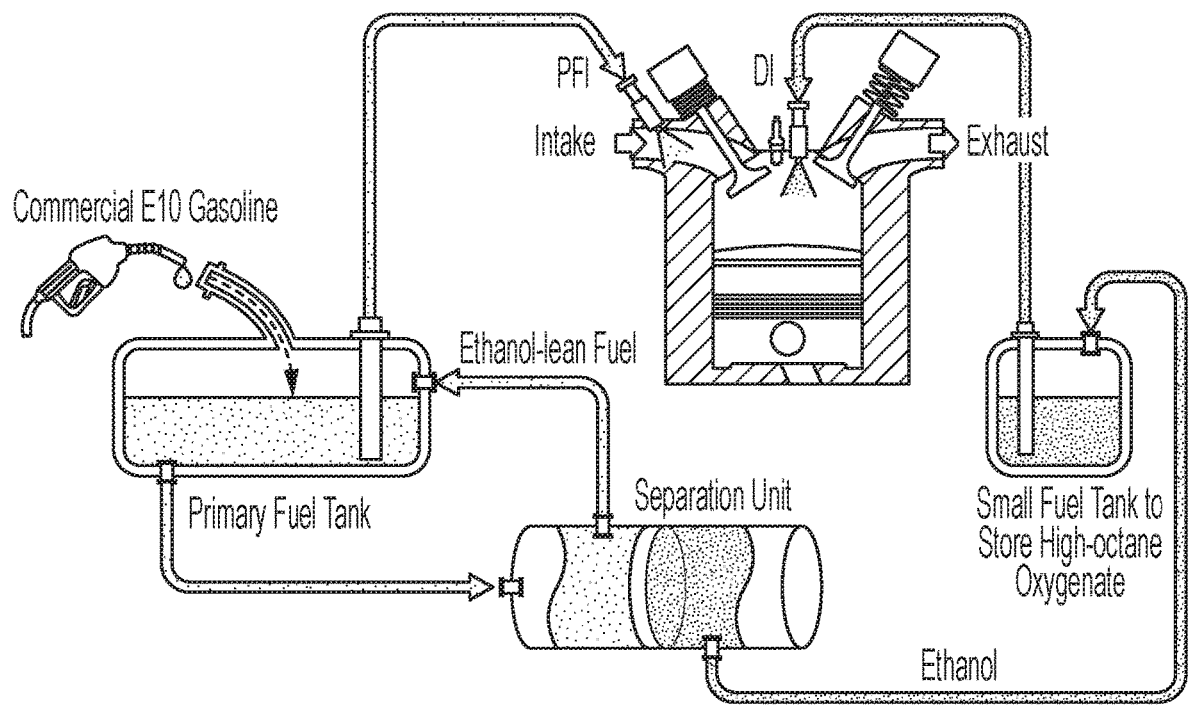
FIG. 1 shows a system diagram for a generic onboard ethanol separation system. In such an arrangement the Primary Fuel Tank holds commercial gasoline and the returned ethanol-lean fraction from the separation unit. The Small Fuel Tank contains separated ethanol. The Separation Unit pictured represents a generic separation approach. In this example, ethanol-lean fuel is supplied to the engine via port fuel injection (PFI), and ethanol is supplied via direct injection (DI).

The following description includes one preferred best mode of one embodiment of the present disclosure. It will be clear from this description of the disclosure that the disclosure is not limited to these illustrated embodiments but that the disclosure also includes a variety of modifications and embodiments thereto. Therefore, the present description should be seen as illustrative and not limiting. While the disclosure is susceptible to various modifications and alternative constructions, it should be understood, that there is no intention to limit the disclosure to the specific form disclosed, but, on the contrary, the disclosure is to cover all modifications, alternative constructions, and equivalents falling within the spirit and scope of the disclosure as defined in the claims.

While on-board gasoline ethanol separations have existed for years. Early systems for example attempted to use distillation to separate the high and low volatility gasoline components in E85 while fractionating the ethanol. Other systems used pervaporation membranes while continuously circulating fuel from the main fuel tank through the separation unit, to remove the high-octane fuel components from the fuel stream and segregating the permeate into a small fuel tank, and returning the retentate to the main fuel tank. Continuous dilution of the feed by retentate ultimately causes a loss in separation efficiency as the pervaporation process loses its driving force.

A recent study using gasoline-ethanol blends suggests that across three commonly used U.S. EPA drive cycles, the average research octane number (RON) requirements to prevent knock at optimal engine efficiency were 41, 51, and 71 for naturally aspirated (NA) engines, increasing to 58, 66, and 83 for 30% downsizing, and 76, 88, and 92 for 50% downsizing, with maximum RON requirements ranging between 90 and 100. These studies suggest that supplying high-octane gasoline across the whole drive cycle unnecessarily consumes high-octane fuel components, such as ethanol, when higher knock resistance is not needed. For example, with regular E10 gasoline (92 RON or 87 AKI), the anti-knock benefits contributed by ethanol are not realized, except during periods of high engine load or heavy acceleration. Notably, the blend stock for oxygenate blending (BOB), i.e., the gasoline base fuel before ethanol is added, is about 85 RON, and can meet average RON requirements for NA engines, 30% downsized engines, and even highway testing (HWFET) for 50% downsized engines.

To better use the anti-knock potential inherent to individual fuel constituents, a two-fuel system, with a high-octane oxygenate, like ethanol, and a lower-octane fuel, such as a gasoline BOB, could prevent knock by delivering the optimum amount of the oxygenate-rich fuel at all points in the drive cycle (octane-on-demand). Implementation of such a strategy would most likely necessitate changes in the fuel and the fuel storage and delivery systems. While not extensively adopted in the U.S., dual-fuel tank vehicles are in use and allow for switching between different types of fuels (e.g., gasoline and compressed natural gas), or handling fuels with different octane numbers. Similarly, dual-fuel injection systems were marketed as early as 2005 by Toyota.

However, dedicated in-vehicle storage and delivery systems for a gasoline and an oxygenate have not been attempted, largely due to the lack of an existing fueling infrastructure and the need to educate consumers. Since the individual fuel components are not by themselves backwardly compatible with existing vehicles, the effect of providing them is the same as simultaneously introducing two new fuels to the market. However, these apparent challenges can be mitigated by an onboard system that separates the high- and low-octane components of an existing market fuel, thereby relieving the need for the introduction of a new fuel, while enabling the advantages of OOD. An example of such a configuration is shown in FIG. 1.

FIG. 1 shows a system diagram for a generic onboard ethanol separation system. In such an arrangement a primary fuel tank initially holds a commercial grade gasoline which is sent to a separation unit wherein a separation of the ethanol or other target materials takes place and this separated portion is then sent to a second location (typically a smaller fuel tank) while an ethanol-lean fraction from original the commercial gasoline is then sent to the primary tank. Overtime iterations of this separation result in a more and more ethanol lean fraction being placed in the main tank while the separated ethanol or other material are captured by the separation mechanism and sent to the separate storage location. When needed the ethanol-lean fuel is supplied to an engine via port fuel injection (PFI), and ethanol is supplied to the engine via direct injection (DI).

Various methods and structure for performing for such onboard separations have been utilized all with varying success. Distillation, pervaporation, membrane separation, have all be attempted with varying levels of success and all raising various challenges. Recognizing the need for further development of the gasoline separation system, namely the need to afford separation of not only ethanol, but other high-octane oxygenate blendstocks like butanol, we decided to bypass potential problems arising from the use of membranes, and implement chemical processes to separate oxygenates from blended gasoline. To our knowledge, there are no reports of chemically reactive separations of ethanol or butanol from a commercially available gasoline.

The following description provides three exemplary strategies for on board separation of oxygenates from gasoline. These include the 1) use of ionic liquids, (ILs), such as 1-butyl-3-methylimidazolium methyl sulfate ([BMIM]$MeSO_4$) and 1-ethyl-3-methylimidazolium acetate ([EMIM]OAc); 2) use of the reactivity of alcohols with bases and $CO_2$ to perform "reactive separations," which can be thermally reversed and recycled; and 3) adsorption of ethanol on solid-supported amine monolayers within a mesoporous silica substrate. Each of these separation strategies has been shown to provide greater than 95% efficiency in separating ethanol from commercial gasoline. While these specific examples are provided it is to be distinctly understood that the invention is not limited to the specific forms disclosed, but to the contrary a variety of modifications, substitutions, alterations and alternative forms thereto.

EXAMPLES

General Procedure: Unless otherwise noted, all reactions were carried out in a nitrogen glovebox using a 10 mL Schlenk flask charged with the sorbent material under study. Gasoline and other reagents were degassed using three freeze-pump-thaw cycles, stored and used in an inert atmosphere glovebox. CO2 was introduced to the reaction flask by freezing the solution with liquid nitrogen, evacuating the headspace, warming the flask to ambient temperature, and adding CO2 until the total pressure achieved was 1.2 atm. Constant CO2 pressure was maintained over the course of the reaction. When reactions with CO2 were not necessary, reactions were carried out under an inert N2 atmosphere. Initial experiments were performed over a 1 h time frame for all bases, and subsequent experiments were carried out for 15 min. Unless otherwise noted, the absorbed or adsorbed alcohol was recovered via short-path distillation with the distillation flask heated using an oil bath and the receiving flask cooled using liquid nitrogen.

E10 gasoline, 87 AKI, and non-ethanolic gasoline, 92 AKI, were obtained locally from Conoco-Phillips. 1,1,3,3-Tetramethylguanidine (99%, TMG), 1-butyl-3-methylimidazolium methyl sulfate (≥97.0%, [BMIM]$MeSO_4$), iso-butanol (99%, i-BuOH), and anhydrous, n-butanol (99.8%, n-BuOH) were purchased from Sigma Aldrich. $CO_2$ (99.999%) gas was obtained from OXARC or Matheson and used without further purification. 1-Ethyl-3-methylimidazolium acetate (97%, [EMIM]OAc) was obtained from Alfa Aesar. Anhydrous, 200 proof, 99.5% ethanol was purchased from ACROS Organics. 1-((1,3-Dimethylimidazolidin-2-ylidene)amino)-3-methoxypropan-2-ol (K1) and a bound ethylenediamine (EDA) moiety, resulting from the reaction of N-[3-(trimethoxysilyl)propyl]ethylenediamine and DAVISIL, tethered to a silica surface to form self-assembled monolayers on mesoporous silica (SAMMS), i.e., EDA-SAMMS, were synthesized as described, and provided for these experiments.

Sufficient E10 ethanolic gasoline was introduced into a Schlenk flask, followed by 1 mL of [EMIM]OAc or [BMIM]$MeSO_4$ for a mole ratio of 1.2-to-1, IL-to-ethanol. The biphasic solution was stirred vigorously for 15 minutes, and the top liquid layer, ethanol-poor gasoline, was decanted. $^1H$ NMR analysis of the top, liquid layer provided the amount of ethanol remaining in the gasoline. Ethanol and any remaining gasoline were removed from the IL layer via short-path distillation. Experiments using the 9% n-butanolic gasoline were performed in the same fashion as described for the ethanolic gasoline. Temperatures and recovered masses are given in Table 1.

1,1,3,3-Tetramethylguanidine was dried over 3 Å molecular sieves prior to use. 1,1,3,3-Tetramethylguanidine (TMG), 1,5,7-triazabicyclo[4.4.0]dec-5-ene (TBD), or 1-((1,3-dimethylimidazolidin-2-ylidene)amino)-3-methoxypropan-2-ol (K1) was introduced into a Schlenk flask, followed by E10 ethanolic gasoline for a mole ratio of 1.2-to-1, base-to-ethanol. Immediately, TMG and K1 dissolved in E10 gasoline, and TBD was not soluble. As described above, 1.2 atm of $CO_2$ was introduced after freezing the solution and removing gases in the headspace under vacuum. Upon thawing the solution and adding $CO_2$, a second phase was observed to form immediately, pooling on the bottom of the flask in reactions using TMG and K1, while for TBD, the entire liquid volume solidified. Further reactions with TBD were not performed. For TMG and K1, the gasoline was decanted, and the ethanol was removed from the IL layer via short-path distillation.

SAMMS-Self-Assembled Monolayers on Mesoporous Support materials refers to a class of materials developed at Pacific Northwest National Laboratory. These are created by a process such as the ones described in U.S. Pat. Nos. 6,531,224 and 6,326,326. Prior to reactions, EDA-SAMMS granules were dried overnight in a vacuum oven at 50° C. and transferred while hot into a glovebox filled with $N_2$. During control adsorption experiments using EDA-SAMMS, $CO_2$ was not used to form the carbamate, thereby allowing ethanol from gasoline to diffuse freely into the pores. As with the liquid sorbents, ethanol-poor gasoline was decanted from the ethanol-rich EDA-SAMMS and the ethanol was recovered via thermal desorption in a short-path distillation apparatus.

For iso-butanol removal experiments, non-ethanolic gasoline was splash blended with iso-butanol to yield 10% alcohol by volume in gasoline.

Water-Saturated Gasoline Experiments with [BMIM]$MeSO_4$ and EDA-SAMMS: Wet gasoline was prepared by drying the regular, degassed E10 gasoline (1316 ppm of $H_2O$) over 3 Å molecular sieves for 24 h (7.2 ppm of $H_2O$) and subsequently saturating it with water by allowing the ethanolic gasoline to contact 0.7 weight percent water overnight after vigorous mixing, resulting in a 3764 ppm of $H_2O$. Undissolved water was separated from the gasoline. Water content was assessed using Karl-Fischer titrations. Reactions identical to those using as-received E10 gasoline were carried out using wet gasoline for the absorption of ethanol (EtOH) into [BMIM]$MeSO_4$ and adsorption of EtOH into EDA-SAMMS treated with $CO_2$ as described in the general procedure. Ethanol separation was measured by comparing the $^1H$ NMR spectra before and after contact with the sorbent.

Cycling Experiment with K1: In the glovebox, a 10 mL Schlenk flask was charged with K1 (3.03 g, 0.015 mol; 1.2 equivalents per 1 equivalent of EtOH in gasoline) and E10 ethanolic gasoline (5.78 g for cycle I and 5.90 g for cycles II and III). Next, the IL was formed by evacuation of the flask during the freeze-pump-thaw process, warming up to an ambient temperature, and vigorously stirring the reaction under 1.2 atm of $CO_2$. Reactions were performed under constant pressure of $CO_2$ for 15 min. After this time, stirring was stopped, $CO_2$ pressure was released, and the layers were allowed to separate. After 1 min, the gasoline layer (upper layer) was removed using a pipette; the lower fraction was set up for distillation at 115° C. After recovery of EtOH, another portion of gasoline was added and the IL was formed as described above. This process was repeated three times overall. The results of the EtOH removal and recovery process were assessed by $^1$H NMR.

Vehicle Exhaust Experiment: Experiments were performed using only EDA-SAMMS as an EtOH sorbent. Vehicle exhaust gases were collected into a TEDLAR polyvinyl fluoride bag using an SKC Grab Air Bag Sampler, gas-sampling pump. Gases were collected from the exhaust downstream of the catalytic converter of a Mitsubishi Outlander Sport 2.4 GT AWC equipped with a 168-hp MIVEC engine that had reached equilibrium operating conditions. Exhaust gases were then supplied to the reaction vessel using a cannula. Prior to connecting the cannula, the reaction vessel was at the gasoline partial pressure. The TEDLAR polyvinyl fluoride bag remained connected during the course of the reaction, allowing the reaction to consume the proper stoichiometric equivalent of $CO_2$.

Three approaches were reviewed for their ability to chemically separate ethanol or butanol from gasoline, through interaction with amines or ILs. The effectiveness of separation and recovery of each alcohol was measured, although not for all separation approaches, with the understanding that for an OOD application, these metrics cannot be considered in isolation. During alcohol separation and recovery, small amounts of gasoline were observed in the alcohol, although at much lower levels than those obtained using membranes. In application, gasoline contamination may be desirable to serve as a denaturant for ethanol, and be unimportant for other alcohols. While there are differences among the approaches, they are fundamentally related in that these materials exhibit strong interactions, or hydrogen bonding, with alcohols. These interactions promote the partitioning of the alcohols into the polar media, which can be separated from the fuel. Alcohols can then be recovered from the polar media through a distillation process, similar to those previously reported, using heat from the engine, the engine exhaust, or the catalytic converter.

Ionic Liquids.

Figure 2A:
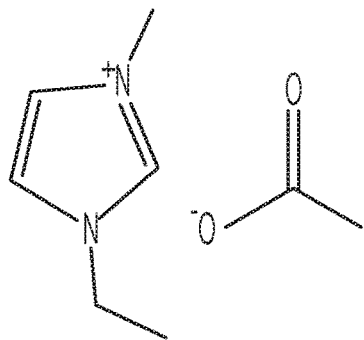
FIG. 2A shows the structure for 1-ethyl-3-methylimidazolium acetate, [EMIM]OAc.
Figure 2B:
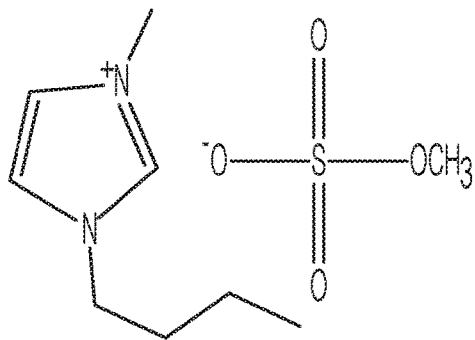
FIG. 2B shows the structure for 1-butyl-3-methylimidazolium methyl sulfate, [BMIM]MeSO4.

The first separation approach relies upon commercially available ionic liquids (ILs)—[EMIM]OAc and [BMIM]MeSO$_4$, (examples of which are shown in FIG. 2) to capture the alcohol. These ILs were chosen based upon their prior use in separations during biofuel processing. These ILs were found to remove up to 98% of the available alcohol from gasoline-depending on the identity of the IL and the alcohol (Table 1). Adsorption of the alcohol into the IL layer required vigorous agitation because of the immiscibility of the ILs with gasoline. While immiscibility may contribute to slower partitioning in the current configuration, in practice, clean separation of the IL layer and the gasoline layer would enable facile isolation of the alcohol-rich IL from gasoline.

Here, based on alcohol content, 1.2 equivalents of each IL were introduced to either 10% ethanolic or 9% n-butanolic gasoline and mixed for 15 minutes, followed by decanting the gasoline layer and using atmospheric pressure distillation to separate the dissolved alcohol from the IL. Distillation temperatures and percentages of alcohol removed are given in Table 1 (as estimated by $^1$H NMR). In these experiments, the ILs and gasoline phases were completely immiscible during alcohol separation, however, vigorous agitation was sufficient to promote alcohol uptake by the IL. Separation rates were not measured, nor were the solutions allowed to remain in contact for a longer period of time, which might have improved separation.

TABLE 1

Percent Removal and Recovery Temperature for EtOH, n-BuOH, and iso-BuOH.

| Commercial Gasoline with | | Separation Media[a] | | | | | |
|---|---|---|---|---|---|---|---|
| | | [EMIM]OAc | [BMIM]MeSO4 | TMG | K1 | EDA-SAMMS | |
| | | | | CO2 Required | | | |
| | | No | No | Yes | Yes | Yes | No |
| 10% (v/v) EtOH | % EtOH removed[b] | 76 | 95 | 97 | 95 | ~100c | ~100d |
| | Recovery temperature (° C.)c | 131 | 125 | 130 | 115 | 120 | 100, 130 |
| 9% (v/v) n-BuOH | % n-BuOH removed[b] | 98 | 72 | | | | |
| | Recovery temperature (° C.)c | 125-135 | 117 | | | | |
| 10% (v/v) iso-BuOH | % iso-BuOH removed[b] | | | | | | ~100d |
| | Recovery temperature (° C.)c | | | | | | 145 |

[a]Where EtOH is ethanol; BuOH is butyl alcohol; [EMIM]OAc is 1-ethyl-3-methylimidazolium acetate; [BMIM]MeSO$_4$ is 1-butyl-3-methylimidazolium methyl sulfate; TMG is 1,1,3,3-tetramethylguanidine; K1 is 1-((1,3-dimethylimidazolidin-2-ylidene)amino)-3-methoxypropan-2-ol; and EDA-SAMMS is a bound ethylenediamine (EDA) moiety tethered to a silica surface to form self-assembled monolayers on mesoporous silica (SAMMS ®).

[b]Mole percent alcohol removed based on $^1$H NMR integrations of the protons adjacent to the hydroxyl group in the alcohol-gasoline sample before and after exposure to the separation media. Integrations were normalized to benzene in the gasoline.

cOil bath temperature during alcohol distillation. These temperatures correspond to the release of bound $CO_2$ from tetramethylguanidinium ethylcarbonate and K1-carbonate, respectively, as well as the release of ethanol.

dEDA-SAMMS experiments were conducted using an excess of ethanolic and butanolic gasoline. The liquid volumes necessary to achieve the 1.2-to-1 ratio used for other experiments, EDA moieties-to-alcohol, resulted in the entire volume of the ethanolic or butanolic gasoline being absorbed into the porous material, thereby necessitating about 5 times the typical gasoline volume to perform a separation. $^1$H NMR integrations showed that 16 mole % of the available ethanol was adsorbed into the EDA-SAMMS material when $CO_2$ was used, and 20 mole % of the available ethanol, or 19 mole % of the available iso-BuOH, when $CO_2$ was not used. These numbers equated to a little over one alcohol molecule for every EDA moiety, or ~100% of that possible. Butanol separations using $CO_2$ with EDA-SAMMS were not undertaken.

With the recent interest in butanols and bio-produced alcohol mixtures as possible gasoline blendstocks, we decided to assess the applicability of our approach to the removal of n-butanol (n-BuOH) from gasoline. n-BuOH-enriched gasoline was splash blended to 9% by volume n-BuOH, as described in the experimental section. Using the same conditions as outlined above (1.2 equivalents of IL to 1 equivalent of alcohol in the fuel), we were able to remove 72% and 98% of n-BuOH using [BMIM]MeSO$_4$ and [EMIM]OAc, respectively. Recovery temperatures were comparable to those obtained for the removal of EtOH using the same ILs (Table 1). As before, we used NMR to quantify the n-butanol remaining in the gasoline following extraction of the n-butanol from the gasoline using ILs.

Interestingly, [EMIM]OAc favored removal of n-butanol, while [BMIM]MeSO$_4$ showed an almost equally high preference for ethanol. These results align with expectations based on the previously reported polarities of the two ILs,[56-57] with the more polar [BMIM]MeSO$_4$ having higher affinity for EtOH and the less polar [EMIM]OAc having higher affinity for n-butanol. Similarly, differences in the distillation temperatures reflect differences in the interactions between the ILs and the alcohols; the higher affinity IL-alcohol pairs require higher distillation temperatures to separate the alcohol from the ILs. Because these reactions were carried out on a small scale, quantification of the alcohol recovered was complicated by residual gasoline and IL in the distillate, as well as by the loss of some alcohol during distillation. These factors are typically alleviated by scaling up the separation process. After separation, residual alcohol in the gasoline was below NMR detection limits. Additionally, ethanol separation was not adversely affected by the presence or absence of water in wet or dry gasoline; concentrations spanned a range from over 3700 ppm to 7.2 ppm water, respectively.

Other potential examples and applications of ILs as a means of separating alcohols from gasoline are not known. The non-volatility and immiscibility of ILs in gasoline offer advantages for separation, such as low loss during the separation process, and the prospect of recyclability. Both [BMIM]MeSO$_4$ and [EMIM]OAc are commercially available and, although the cost for imidazolium-based ILs is still considered to be high, alternatives are being explored The use of ILs for separations in the biomass community suggests that there are stability concerns under prolonged exposure to high temperatures and water. However, the separation processes described here are comparatively low in water concentration, and exposure to high temperatures is of shorter duration and generally lower in temperature than conditions used for biomass separation. The ILs investigated here showed selectivity for polar gasoline components. Further optimization of the ILs for separation under these conditions was not undertaken, leaving room for identifying ILs with improved stability, recyclability, and selectivity, as well as adaptation of the ILs to separate other fuel components, if doing so becomes desirable.

Switchable-Polarity Solvents.

Figure 3:
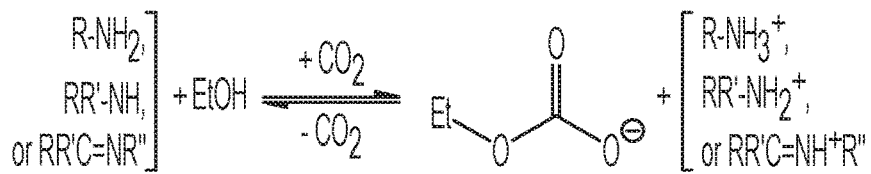
FIG. 3 shows Equation 1. Formation of alkyl carbonate salts by the reaction of a primary or secondary amine, an imine, or a guanidine, with ethanol and carbon dioxide.

A second separation approach exploits the changes in the polarity of an organic amine reacting with alcohol and CO$_2$ to form an alkylcarbonate IL (see FIG. 3), exemplified by Jessop's switchable-polarity solvents such as those described in U.S. Pat. Nos. 7,982,069; 8,283,385; 8,513,464; 8,580,124; 8,710,265; or 8,900,444. In the absence of CO$_2$, the base is completely miscible with ethanolic gasoline, but upon addition of CO$_2$, the amine reacts with alcohol and CO$_2$ to form a second, liquid phase, with higher alcohol content. This layer can then be easily drained from the separation tank for further processing, and the lighter EtOH-lean gasoline can be immediately returned to the fuel tank. This approach allows the switchable-polarity solvent to be miscible with the gasoline at the beginning of extraction, and readily separable once isolation of the ethanol is complete. Initial miscibility may provide a more rapid or selective alcohol separation approach than the ILs, although rates of reaction and selectivity are left for future work.

Figure 4A:
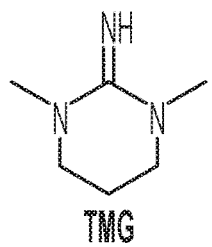
FIGS. 4A-4D show the structures of bases used in this investigation.
Figure 4B:
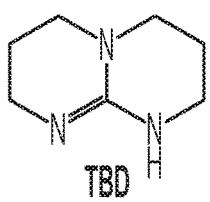
Figure 4C:
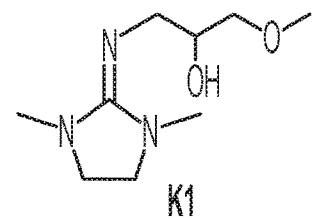
Figure 4D:
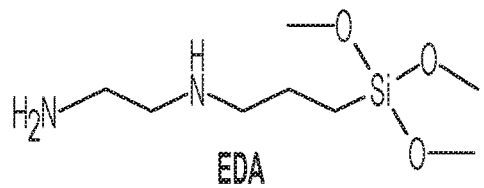

For this investigation, three non-volatile organic bases (FIGS. 4A-4C) were screened. At room temperature, 1,1,3,3-tetramethylguanidine (TMG) and 1-((1,3-dimethylimidazolidin-2-ylidene)amino)-3-methoxypropan-2-ol (K1) are gasoline-miscible liquids, while 1,5,7-triazabicyclo[4.4.0]dec-5-ene (TBD) is a solid and only sparingly soluble in gasoline. In the presence of ethanol, both TMG and TBD immediately form carbonate salts upon addition of CO$_2$.

In contrast, K1 reacts with CO$_2$ to form a carbonate salt, regardless of the presence of ethanol, through the intramolecular reaction of the guanidine and alcohol groups with CO$_2$. The carbonate salts of TMG and K1 coalesce to form a second liquid layer at the bottom of the flask that is immiscible with gasoline and volumetrically greater than the base originally introduced into the flask. In contrast, upon addition of CO$_2$, TBD promoted solidification of the entire reaction mixture, and was not studied further. The carbonate salts are ionic in nature and liquid at room temperature, behaving similarly to the ILs described above.

Simple amidine or guanidine bases, like TMG, form guanidinium ethylcarbonate ILs upon reaction with ethanol and CO$_2$. TMG was found to perform well in this separation when using a 1.2:1 ratio (TMG:EtOH); it extracted about 97% of the available EtOH from the gasoline with very little gasoline dissolved in the IL layer. Increasing the ratio of TMG:EtOH to 3.4:1 and 7:1 did not increase the separation efficiency, but instead made separation of the layers more difficult by reducing the quality of the phase boundary, and increasing the solubility of the gasoline in the IL layer. Upon separation of the TMG/EtOH layer, ethanol was recovered by distillation by heating the IL layer in a 130° C. oil bath, a temperature close to that needed to release ethanol from the ILs. This temperature also restores the TMG, reversing the reaction although the resulting evolution of CO$_2$ was indistinguishable from boiling during distillation and did not cause foaming.

In a similar process, a single-component alkanol guanidine (K1) was used to separate ethanol from gasoline. As with TMG, K1 is miscible with E10 gasoline, and addition of CO$_2$ to the headspace in the flask causes phase separation and formation of the zwitterionic guanidinium alkylcarbonate IL (K1-carbonate). This is in agreement with the known increase in polarity of alkanol guanidines upon formation of the CO$_2$-containing zwitterion. Whether the IL was formed in the presence of ethanol, or pre-formed and then exposed to E10 gasoline, ethanol was found to partition equally well into the IL phase. EtOH recovery was accomplished by heating the IL to 115° C., releasing bound CO$_2$ from the K1-carbonate, and releasing ethanol; temperatures were comparable to those observed for the ILs.

On average, K1 removed about 95% of the available ethanol when used in slight excess (1.2 equivalents); only a small amount of gasoline partitioned into the IL phase. Unlike TMG, a sharp phase separation was maintained between the K1-carbonate and gasoline with higher ratios of K1:EtOH, and increased partitioning of gasoline into the IL layer was not observed. The inherently greater polarity of the K1-carbonate zwitterion over the TMG-ethylcarbonate greatly reduced the solubility of the nonpolar gasoline in the IL phase, thereby contributing to the distinct phase boundaries observed in separations using K1. Additionally, formation of an IL phase with TMG requires the presence of three components—TMG, $CO_2$, and ethanol-whereas for K1, only two components are required—K1 and $CO_2$. In the presence of excess base and $CO_2$, K1 always forms an immiscible IL, but formation of the IL in the case of TMG is limited by the amount of ethanol present. Excess TMG remains soluble in gasoline, potentially causing loss of the unbound TMG when insufficient ethanol was present. Interestingly, while the ILs formed from TMG and K1 effectively exclude the nonpolar gasoline components, the slightly polarizable aromatic species show a preference for absorption into the IL over the non-polarizable paraffinic species.

In case of the K1 base, low ethanol recovery was observed when the distillation temperature was slowly ramped to 115° C. After approximately 70% of the captured ethanol was distilled and collected, ethanol distillation ceased. Upon further increase of the distillation temperature to 130° C., additional distillate was collected. The second distillation fraction consisted of ethanol, some gasoline components, and a small amount of K1. The two-step distillation is thought to be associated with loss of $CO_2$ from the K1-carbonate IL, and the concomitant loss of homogeneity of the liquid in the distillation flask. Subsequent distillations immediately advanced the distillation temperature to 115° C., permitting recovery of effectively all of the ethanol, with minor quantities of the gasoline components present. This approach also allowed us to bypass the $CO_2$-loss process and K1 carryover.

In a separate series of experiments, we tested the possibility of re-using K1 for ethanol separation (Table 2). Here, three consecutive ethanol separation and recovery experiments were performed using K1, $CO_2$, and E10 gasoline, without significant change in process efficacy. For Cycle II, only 70% of the ethanol was recovered, however for Cycles I and III all of the ethanol was recovered, as well as the residual ethanol from Cycle II. Note that in these recycling experiments, after each EtOH release cycle, K1 had to be charged with $CO_2$ to form the IL before ethanol separation could occur.

TABLE 2

EtOH Recovery from K1-Carbonate during the "Cycling" Experiment

| Gasoline Component | Cycle I (g) | Cycle II (g) | Cycle III (g) |
|---|---|---|---|
| E10 Gasoline | 5.78 | 5.90 | 5.90 |
| EtOH available | 0.57 | 0.59 | 0.59 |
| EtOH recovered[a] | 0.61 | 0.40[b] | 0.85[b] |

[a]All fractions contain residual gasoline. No further separation efforts were made.
[b]Not all EtOH was recovered at this step (70%); the remaining EtOH was recovered during the third cycle (140%). The mass balance of the EtOH during the three cycles closely matches the expected output.

When compared to [BMIM]MeSO$_4$ and [EMIM]OAc, the switchable-polarity solvents, TMG and K1, offer full miscibility when needed, as well as triggered phase separation. Initially, TMG and K1 are miscible with gasoline, but upon addition of $CO_2$, the layers become immiscible and phase segregate. The homogeneous switchable-polarity solvent-gasoline system avoids the need for ethanol to contact the IL in a liquid-liquid extraction process, as would be required for a two-phase IL-separation. Speed of separation is governed by the gaseous diffusion of $CO_2$ into the homogeneous switchable-polarity solvent-gasoline solution, offering the promise of faster separation than might be possible using traditional ILs for which liquid-liquid extraction and contact area determine the separation rate. Additionally, careful selection of the base can determine the viscosity of the $CO_2$-saturated, ethanol-rich material, high viscosities enable facile decantation of the alcohol-poor gasoline layer and low viscosities offer easy fluid transfer from one point to another. The flexibility represented by the switchable-polarity solvents may enable faster and/or simpler engineering solutions for alcohol separation than would otherwise be possible using traditional ILs.

Figure 5:
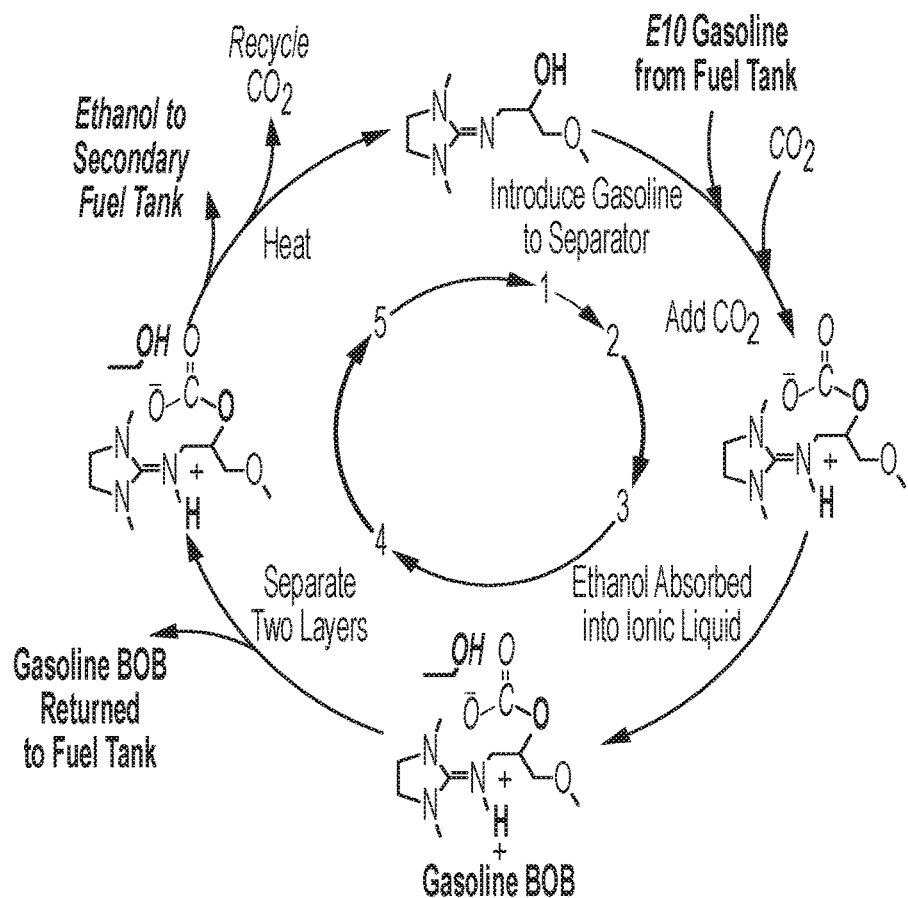
FIG. 5 shows a proposed EtOH removal cycle using a switchable-polarity solvent. (1) E10 gasoline is combined with K1. (2) $CO_2$ is added to form the K1-carbonate species (ionic liquid), which separates from gasoline. (3) Ethanol is absorbed into the polar ionic liquid layer. (4) The immiscible gasoline and ionic liquid layers are separated. (5) The ionic liquid layer is heated, decomposing the K1-carbonate, and releasing $CO_2$ and ethanol.
Figure 6A:
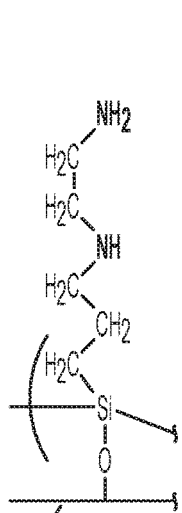
FIG. 6A shows and Idealized drawing of silica-bound ethylenediamine (EDA) from the reaction of N-(3-(triethoxysilyl)propyl)ethylenediamine with a silica substrate like DAVISIL or MCM-41 to form self-assembled monolayers on mesoporous silica (SAMMS).
Figure 6B:
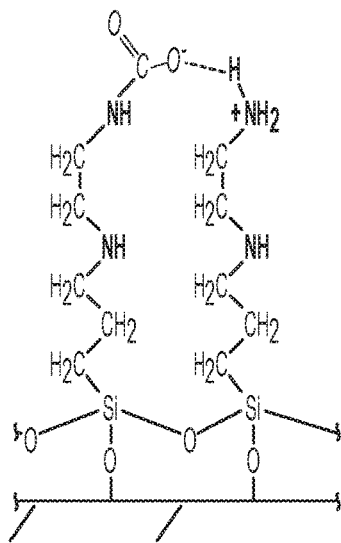
FIGS. 6B and 6C show two possible binding modes for CO2 on the EDA monolayer surface to form a carbamate species.
Figure 6C:
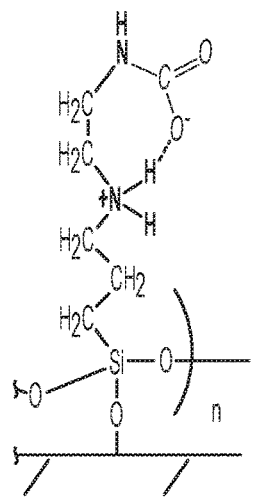

Using ethanol and K1 as an example, FIG. 5 shows a proposed cycle for separating ethanolic gasoline into a high-octane component and a lower-octane, gasoline-only, BOB. This cycle shows mixing K1 with the gasoline, followed by in situ formation of the K1-carbonate IL using $CO_2$. Phase separation of the ethanol-rich IL and BOB occurs immediately. Next, the two phases can be physically separated, and the BOB returned to the vehicle fuel tank. Heating the ethanol-rich IL would release the ethanol, which would be stored in a separate tank and used in an OOD system. During the last step, captured $CO_2$ would be released and K1 would cycle back into the separator to restart the ethanol removal process.

To avoid potential mixing of liquid phases, we investigated using solid-supported amines. Our third separation strategy focused on using an ethylenediamine (EDA) moiety covalently bound to a porous silica substrate, DAVISIL, similar to approaches previously reported for Self-Assembled Monolayers on Mesoporous Supports (SAMMS). Here, an EDA monolayer was formed by reacting N-(3-(triethoxysilyl)propyl)ethylenediamine reacted with a DAVISIL support to form an "EDA-functionalized" sorbent material, EDA-SAMMS, Mass loss recorded during TGA confirmed the EDA-SAMMS sorbent contained 15% EDA ligand by weight, which equates to approximately 1.15 mmoles of accessible primary amine sites per gram of EDA-SAMMS material. We hypothesized that during the separation of ethanol from E10 gasoline using EDA-SAMMS, the following pathways should be considered: 1) Reaction of EDA-SAMMS with $CO_2$ to form carbamates on the EDA-SAMMS surface, thereby generating a strongly polar surface that could interact with ethanol. Carbamate formation would require the presence of two amine residues. Adsorption of ethanol into the polar, porous EDA-SAMMS support, with hydrogen bonding between the ethanol molecules and the neutral amine moieties driving the interaction without the participation of $CO_2$.

To gain insight into which pathway is operational, we performed several reference reactions using a soluble model compound, N-[3-(trimethoxysilyl)propyl]ethylenediamine, which has the same amine functionality as the EDA-SAMMS. Use of a soluble compound enabled us to monitor formation of a carbamate or carbonate species using NMR spectroscopy. Addition of $CO_2$ gas to a chloroform solution of N-[3-(trimethoxysilyl)propyl]ethylenediamine led to formation of the carbamate species, as evidenced by the appearance of a resonance at 163 ppm in the $^{13}C\{^1H\}$NMR spectrum (carbamate carbonyl). In reactions where ethanol was present in the reaction mixture, we excluded the possibility of the formation of ethylcarbonate (over the carbamate), because there was no observable signal near 63 ppm, which would be attributable to the methylene group from ethanol in ethylcarbonate. These results suggest that pathway (2) does not contribute appreciably to ethanol separation in the EDA-SAMMS system.

EDA-SAMMS are porous materials, so it was not possible to use a 1.2:1 stoichiometric ratio, active sites:EtOH, as was used previously for the ILs and the bases, TMG and K1, because in the process of wetting the material, the small amount of E10 gasoline was completely absorbed, leaving no liquid behind. Therefore, investigations using EDA-SAMMS were carried out in the presence of excess E10 gasoline, and calculations reflecting the percent ethanol removed assumed that for each EDA moiety, only one of the amine sites was available for formation of the carbamate species. The percent ethanol removed from the total ethanol available is also reflected in Table 2.

The admixture of EDA-SAMMS and E10 gasoline was treated with $CO_2$, which resulted in the removal of ethanol in a quantity that is consistent with the available EDA on the SAMMS surface. After separation of the solid EDA-SAMMS from the EtOH-lean gasoline, EtOH was recovered by heating the wet EDA-SAMMS in an oil bath maintained at 120° C. During this treatment, not only EtOH was recovered, but also a residual gasoline fraction that was trapped in the pores.

Control reactions using EDA-SAMMS and E10 gasoline in the absence of $CO_2$ led to removal of EtOH from the fuel in quantities comparable to those in the $CO_2$-dependent reaction (Table 2), indicating that $CO_2$ was unnecessary for this process. This suggests that pathways (1) and (3), outlined above, are available in this system with negligible input from pathway (2). That $CO_2$ is not necessary is noteworthy, because it implies that the process of removal of EtOH from E10 gasoline can be significantly simplified.

As with n-butanol, we decided to investigate the applicability of our $CO_2$-independent solid-state sorbent to the removal of iso-butanol from gasoline. We prepared a 10% by volume splash blend of iso-butanol with non-ethanolic gasoline, and, using the method outlined above for EtOH separation, removed the iso-butanol at quantities corresponding to the saturation of the EDA moieties. Alcohol recovery was accomplished by decanting the iso-butanol-lean gasoline from the reaction vessel and heating the slightly wet EDA-SAMMS to 145° C. At this temperature, iso-butanol recovery was deemed complete, as assessed by the recovered mass.

Ease of separation and the potential for not requiring $CO_2$ may make porous solids, like EDA-SAMMS, preferred for OBS over the biphasic liquid approaches. The porous nature of the solid combined with the high surface area allows for rapid equilibration of the interior of the sorbent with a concomitantly high mass transport rate into and out of the sorbent.

Additionally, solid sorbent materials can be conveniently separated from gasoline after ethanol removal. For example, the solid, granular EDA-SAMMS material used in this work can be packed in a separation bed, or formed into a porous monolith, as dictated by system design demands. Although severely limited, in 2014 Mukoyama attempted application of commercially available zeolites to selectively adsorb ethanol from gasoline. While the hydrophilic zeolites adsorbed a large amount of ethanol at 80° C., the presence of acidic residues within the zeolite inhibited desorption rendered the use of the zeolites studied infeasible.

The advantage of using a solid sorbent comes with a penalty. In the case of EDA-SAMMS, the underlying silica framework contributes to mass and volume, lowering reactive volumetric site density. In practice a greater mass and volume of EDA-SAMMS are required to achieve a number of reactive sites equivalent to that of an IL or switchable-polarity solvent, where the reactive site density effectively equals the molar volume of the liquid. This seeming deficit may be partially offset by gains derived from the shorter time required to reach equilibrium and the ease of physical separation. The porous nature of the solid sorbent can also offset the low volumetric reactive site density. We propose that in the case of EDA-SAMMS, without exposure to $CO_2$, adsorption occurs as a result of a strong hydrogen bonding interaction between the alcohol and the amine monolayer, while after exposure to $CO_2$, adsorption results from the interaction of the alcohol hydrogen bond and the carbamate dipole. Additional capacity within the sorbent can be attained by extension of the hydrogen bonding network from the monolayer surface into the pore volume, contributing to the sorption of additional alcohol molecules and possible multi-layer adsorption, thereby significantly increasing the ethanol capacity beyond what might be expected stoichiometrically.

Figure 7:
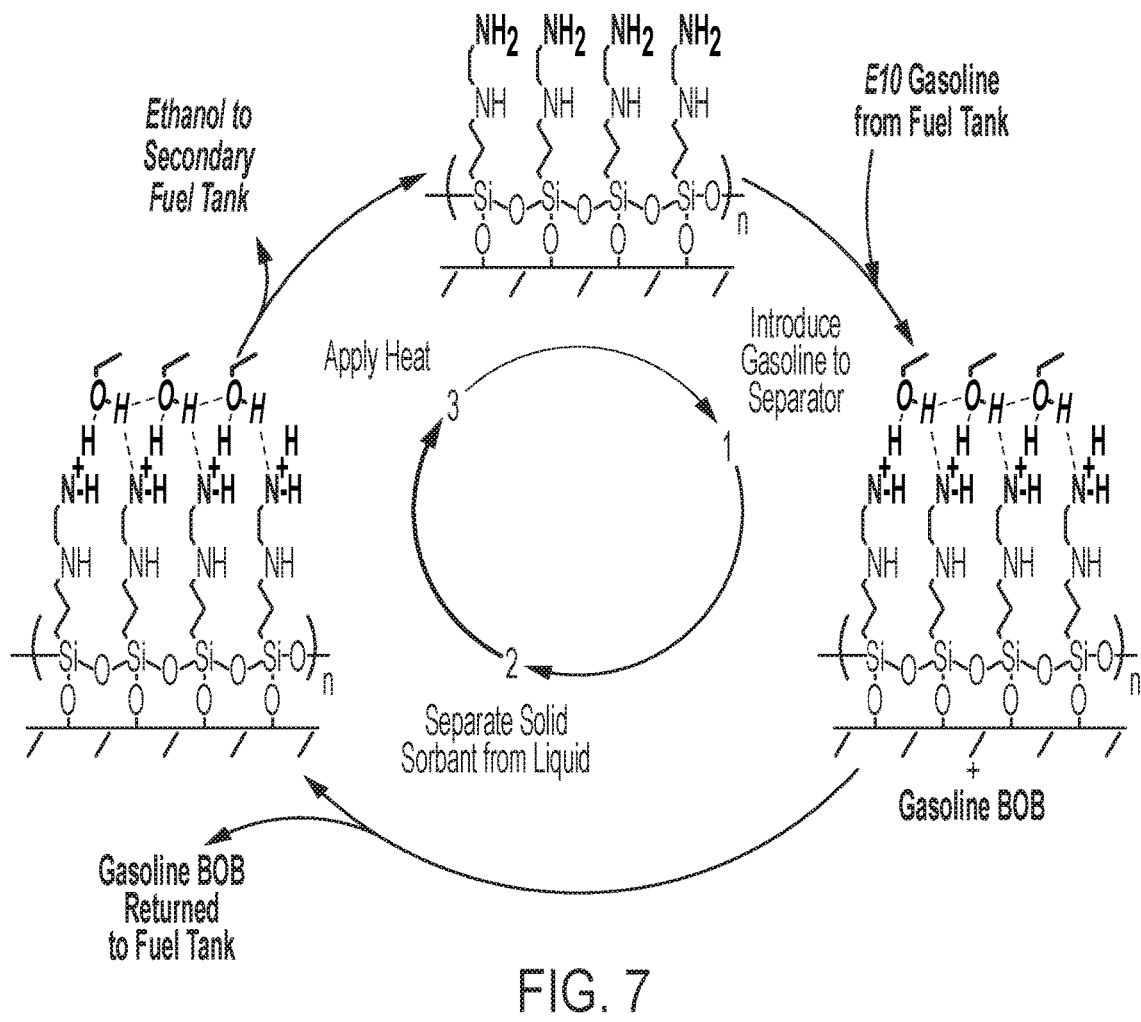
FIG. 7 shows proposed EtOH removal cycle using EDA-SAMMS wherein E10 gasoline is introduced to the EDA-SAMMS sorbent. The polar ethanol molecules are attracted to the surface via hydrogen bonding. Physisorbed ethanol continues to fill the pores until capacity or equilibrium is reached. The gasoline BOB, along with any residual ethanol, is separated from the ethanol-rich EDA-SAMMS. The EDA-SAMMS is heated, releasing ethanol and readying the EDA-SAMMS for service.

While FIG. 5 shows a complex example of how an OBS cycle could occur using K1, simpler systems, employing either commercial ILs or supported separation media, like EDA-SAMMS, can also be envisioned. A proposed separation cycle for these simpler systems is shown in FIG. 7. With further optimization of the separation chemistry and testing for durability, a viable onboard ethanol separation process could be realized.

Although $CO_2$ is not essential for separations using EDA-SAMMS, we conducted an experiment using vehicle exhaust gas as the $CO_2$ source to form a carbamate and affect ethanol separation from E10 gasoline. Exhaust gases were captured from an operating vehicle and used to react with EDA-SAMMS. The ability of the EDA-SAMMS to separate ethanol was identical to that observed when using pure $CO_2$ at atmospheric pressure. This result suggests that if an approach using $CO_2$ is desirable, vehicle exhaust could provide an acceptable source of $CO_2$ for onboard ethanol separation, potentially without the need to dry the $CO_2$ or remove other exhaust components. Additionally, ethanol separation from E10 gasoline saturated with water was tested using [BMIM]MeSO$_4$ and EDA-SAMMS, yielded results identical to those using as-received E10 gasoline. These results suggest that water at about 3700 ppm does not appreciably affect the ability of these materials to separate ethanol. These results are encouraging, although long-term stability and degradation of the sorbent materials has not been established. While considerable testing remains to establish material durability, these data points, along with the relatively low temperatures required to recover ethanol from the sorbents (Table 2), suggest that alcohols can be separated from gasoline using resources intrinsic to the vehicle.

The foregoing provides a basis for selecting and testing new classes of materials for onboard ethanol separation from a commercial gasoline as part of an OOD strategy seeking to improve fuel economy by as much as 17.5-30%. We have shown that 1) ILs can physically absorb either ethanol or butanol from gasoline, though the immiscibility of the IL with gasoline may limit the rate of alcohol removal; 2) reactive separation of alcohols using switchable-polarity solvents, like guanidine bases, allows the initially miscible solvent to form a distinct, readily separable layer upon reaction with an alcohol and $CO_2$; and 3) the amine-functionalized porous silica, EDA-SAMMS, exhibits an ability for capturing alcohols from gasoline that is similar to that of liquid bases. For approaches 1 and 2, alcohols can be recovered via distillation, returning the original IL or the switchable solvent, and in the latter case, releasing captured $CO_2$. For approach 3, thermal desorption of the alcohol separates the alcohol and returns the solid sorbent. While the solid sorbent appears much easier to separate and handle than liquid sorbents, and may not require the introduction of $CO_2$ to be effective at removing an alcohol from gasoline, strategies for separating liquid sorbent materials may prove to be equally facile.

As previously noted, an onboard distillation system (OBDS) has been shown to be effective at separating low boiling point fractions from gasoline or E85 gasoline. While these systems used distillation to separate a gasoline stream into two components, approaches in this paper require the alcohol-rich sorbent and gasoline to be physically separated, prior to heating the sorbent and recovering the alcohol. Separation of the gasoline and sorbent does not need to be complete for an OBS-OOD system to be effective. For a solid sorbent system, a batch processing approach might entail draining the gasoline from the separation unit, while leaving the alcohol-rich solid sorbent to be heated in place, thermally desorbing and capturing the alcohol inside the separation unit for transfer to a secondary storage tank.

In the case of a liquid sorbent, a continuous process might be employed, where the gasoline and liquid sorbent would remain in contact in the separation unit, while a portion of the alcohol-rich sorbent was segregated for alcohol removal in an OBDS, and then the alcohol-poor sorbent would be returned to the separator. In their simplest conceptions, both approaches introduce the need for fluid transfer, as well as a need to heat the sorbent to recover the alcohol, as well as a need for cooling to condense the alcohol vapor. OBS approaches using pervaporation membranes also require heating and cooling, as well as a means of lowering the pressure on the permeate side of the membrane to drive the separation. While distillation and thermal desorption approaches may be of relatively low complexity, it remains to be shown whether a robust distillation system could be feasible in commercial vehicles.

Liquid and porous separation media offer flexible alternatives to membranes. While liquids allow for facile movement of the separation media, potentially enabling more effective heat transfer, ethanol-lean fuel can readily be removed from the solid separation media for oxygenate recovery. These approaches can be adapted for separating a variety of oxygenates, and can already accommodate, or be readily adjusted to, changing fuel compositions without extensive development time.

The alcohol recovery approaches described here can reduce giveaway of high-octane fuel components, enabling construction of considerably smaller separation units, because they do not require the very large surface areas needed for membranes. These proof-of-concept tests suggest that it may be possible to adapt these proposed strategies for onboard oxygenate separation from gasoline without requiring resources outside of those provided by the vehicle. Such an arrangement could enable simpler construction of OBS unit construction or better separation approaches may open up the possibilities of retrofitting existing vehicles with OBS units.

Further research is being performed in our laboratory to advance our understanding of the chemistry of each approach and the adaptations necessary to achieve a feasible solution for onboard ethanol and butanol separation in a working vehicle. We are also exploring whether the presented approaches may be applied to other oxygenates in gasoline, or to remove and reintroduce other classes of gasoline constituents, such as olefins or aromatics, to enhance engine performance or reduce vehicle emissions. Additional considerations for future work include quantifying separation rates, understanding whether 1) sorbent materials require refreshing because of degradation or loss, 2) long-term use of $CO_2$ from a vehicle exhaust affects sorbent behavior, and 3) combustion of the sorbent materials affects engine components or produces undesirable emissions.

While various preferred embodiments of the disclosure are shown and described, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method for on-board separations of preselected materials from a commercial fuel, the method comprising the steps of:
   introducing the commercial fuel to a solid sorbent material that captures the preselected materials, wherein the preselected material is selected from the group consisting of alcohols, oxygenates, olefins, aromatics, and paraffins and combinations thereof;
   separating the solid sorbent material from the commercial fuel, wherein the solid sorbent material is a porous sorbent material having a surface designed to attract the preselected material, and wherein the solid sorbent material is a SAMMS-based sorbent material; and
   subjecting the solid sorbent material to preselected conditions to release the preselected materials and regenerating the solid sorbent material.

2. The method of claim 1 wherein the fuel is selected from the group consisting of gasoline, diesel, naphtha, and combinations thereof.

3. The method of claim 1 wherein the commercial fuel is held in a first tank and the preselected materials are directed and held in a second tank.

4. The method of claim 1 wherein the preselected conditions include swinging the polarity of the immiscible layer.

5. The method of claim 1 wherein preselected conditions include a change in temperature.

6. The method of claim 1 further comprises the step of collecting the preselected material after release.

7. The method of claim 6 further comprising the step of reinserting collected materials into the fuel.

* * * * *